Jan. 8, 1963
F. A. GROTH
3,072,520
VACUUM-FORMING OF A LAMINATED ARTICLE HAVING
A RESILIENT CENTRAL LAYER
Filed Jan. 20, 1959
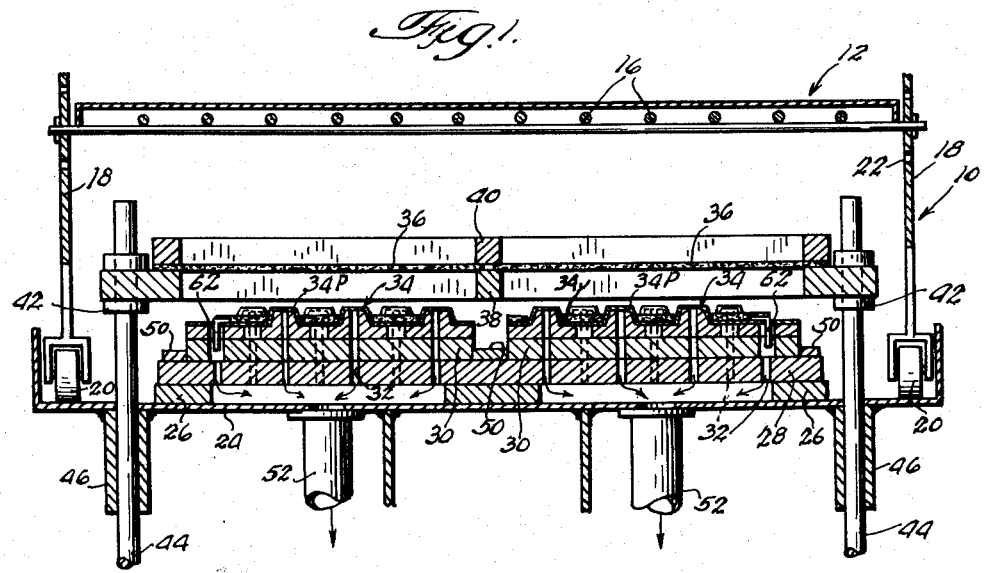
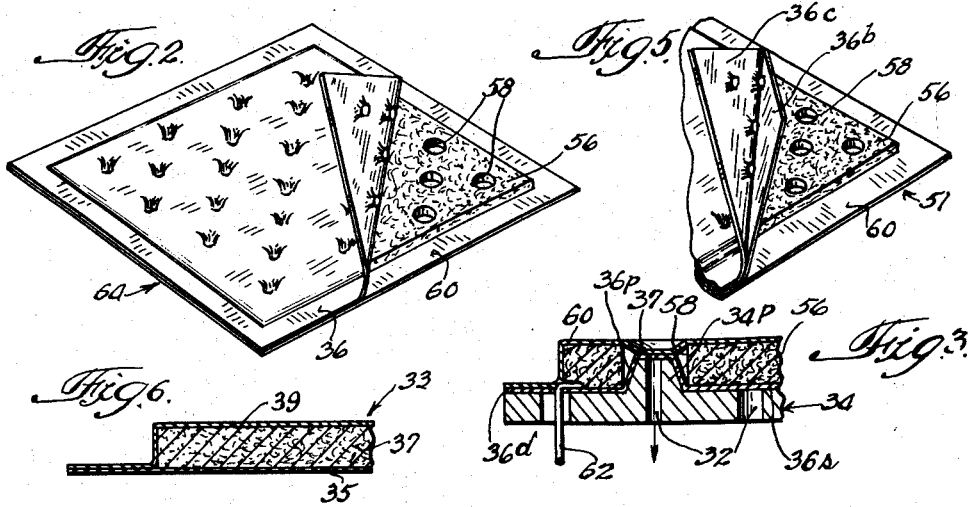
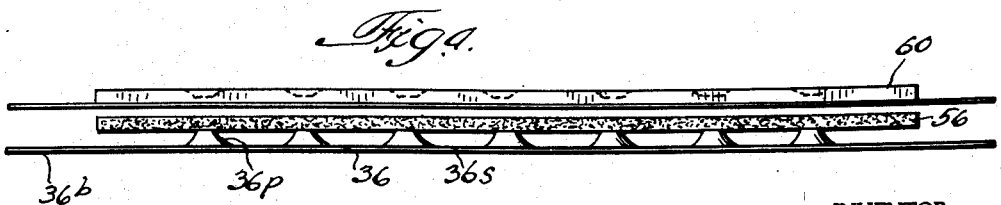
INVENTOR.
Fred A. Groth
BY

United States Patent Office 3,072,520
Patented Jan. 8, 1963

3,072,520
VACUUM-FORMING OF A LAMINATED ARTICLE HAVING A RESILIENT CENTRAL LAYER
Fred A. Groth, 6708 N. Newgard Ave., Chicago, Ill.
Filed Jan. 20, 1959, Ser. No. 787,872
3 Claims. (Cl. 156—213)

This invention relates to a novel laminated article of manufacture and also pertains to methods for making the same.

The manufacture of furniture articles, particularly tufted items, oftentimes is a time-consuming operation requiring cumbersome and frequently expensive machinery. The time expenditure and difficulty experienced in manufacturing tufted items for instance is of course reflected in the cost of the same. The formation of tufts often requires both mechanical and manual operations. The advantages of a short, fully automatic operation dispensing with previously necessary manual operations is believed apparent.

Pillows, pads, and the like, even though tufted, allow shifting of the inner padding so that a lumpy, unsightly article results, having no visual appeal and affording little or no comfort to the user.

It is an object of this invention therefore to provide a substantially automatic vacuum-forming method for the formation of laminated articles including tufted laminated articles.

It is a further object of this invention to provide a laminated article possessing a new and improved structure and sturdiness of assembly which renders the article long-lasting in the normal course of use.

It is another object of this invention to provide a novel facing or shell-like article of manufacture having an external tufted appearance for use in those applications in which only a tufted appearance is desired, as will hereinafter be explained in greater detail.

It is a still further object of this invention to provide a novel tufted article and method for forming the same which employs well known materials and apparatus, thereby increasing the commercial feasibility thereof.

The above and other objects of this invention will become more apparent upon proceeding with the following description when read in the light of the accompanying drawing and appended claims.

In one embodiment of the provided invention a sheet of plastic such as vinyl plastic is inserted in a holding frame of a vacuum-forming machine and heated until pliable. The sheet is then forced by suction over an apertured mold in communication with a vacuum chamber whereby the sheet is tightly drawn to the mold surface. The mold has an upper surface with negative details of a selected pattern providing a tufted button effect at regular spacing over the upper surface thereof. The plastic material is formed over the mold and retained in place thereon. A preferably resilient air-permeable filler layer of cotton or fiber is punched to form apertures therein conforming with the points where the negative tuft details project from the mold and the overlying vinyl sheet. The filler layer is placed upon the mold and overlying sheet so that the projecting tuft formations interfit with the filler layer apertures, leaving peripheral portions and projecting button portions of the facing sheet exposed and uncovered by the filler layer.

An adhesive-coated film of plastic is then placed in the machine sheet-holding frame and, following heating of the sheet and lowering of the frame, forced by suction against the filler layer and facing sheet uncovered exposed portions resulting in an article having a desired tufted appearance and sturdy construction. A hole is punched in a border portion of the facing sheet to allow the entrapped air between the facing and backing sheets to escape in the course of applying the latter sheet, as will hereinafter be explained in greater detail.

For a more complete understanding of this invention reference will now be made to the drawing wherein:

FIGURE 1 is a fragmentary transverse sectional view illustrating apparatus which may be employed in the formation of a laminated article formed in accordance with this invention;

FIG. 2 is a perspective view of a laminated article formed in accordance with this invention in which the upper facing layer is pulled away from the underlying layers thereof;

FIG. 3 is a fragmentary sectional view of a mold and an air conduit which are employed in the formation of a laminated article provided by this invention;

FIG. 4 is an exploded view illustrating three layers (in side elevation) that may be employed in the formation of a laminated article made in accordance with this invention;

FIG. 5 is a fragmentary perspective view similar to FIG. 2 illustrating a modified facing layer which may be employed in the formation of a laminated article provided by this invention; and FIG. 6 is a fragmentary sectional view illustrating a modified laminated article which may be made in accordance with this invention.

Referring now to the drawing and more particularly to FIG. 1, apparatus for the vacuum-molding of plastic materials is fragmentarily illustrated. Machine 10 is the same as that disclosed in my Patent No. 2,832,094, which issued April 29, 1958. Only those portions of the machine are illustrated in the drawing which are believed necessary for an understanding of this invention.

In FIG. 1 the numeral 12 identifies a movable oven having a ceiling portion in which are disposed resistance heating elements 16 interposed between wall portions 18. The walls are movably supported upon two sets of rollers 20 disposed at opposed longitudinal end portions of walls 18. The walls 18 are perforated as at 22 to enable the heating elements 16 to be disposed at a desired distance above table portion 24 of the illustrated apparatus.

Supported on tabel portion 24 of apparatus 10 in FIG. 1 is a support frame 26 which has superposed thereon a mounting platform 28. Disposed atop the mounting platform are two mounting bases 30. Both of the mounting bases and the mounting platform have communicating air passageways 32 for purposes which will hereinafter be made apparent. Mounting bases 30 are adapted to releasably engage mold members such as illustrated negative, or female, mold members 34 shown atop the mounting bases.

It is the purpose of the negative molds 34 to have sheets of plastic material such as sheets 36 draped thereover after the same have been heated and rendered pliable and forced into conformity with the surface configuration of the molds by means of suction drawn through the molds. As illustrated, plastic sheets 36 are secured in position by means of a lower frame 38 and an overlying cooperating hold-down frame 40. Frame 38 engages collar members 42 at opposed lateral end portions, the collar members 42 being locked or otherwise fixedly positioned on illustrated vertical operating rods 44.

The latter rods are reciprocally movable by motive means (not shown) and guided in the course of such movement by collars 46 secured to the undersurface of table portion 24 of the illustrated apparatus. In the normal vacuum-forming operation a sheet of plastic material such as vinyl is placed between frame portions 38 and 40, and movable oven 12 is positioned thereover. The resistance heating elements 16 are activated to radiate heat until the plastic sheets 36 disposed in the underlying members are rendered soft and flexible. The vertical operating rods 44 are then lowered and a substantially air-tight seal is formed between the frame 38 and gasket members 50 disposed on the mounting platform 28. After the seal has formed air is exhausted from between the plastic sheets 36 and table portion 24 of the illustrated apparatus by means of exhaust conduits 52 which are in communication with a vacuum-creating means (not illustrated).

As will be noted from FIG. 1, each mold 34 has projecting portions 34p rising from the valley portions 34v. In the particular mold illustrated the plastic sheets 36 will be drawn by suction against the mold surface to assume a general tufted configuration which may be seen in side elevation in the exploded view of FIG. 4, and in FIG. 2 in a position inverted over that illustrated in FIG. 1.

As will be seen from FIG. 4, projecting portions 36p protrude a distance from the surface portion 36s of the sheet 36, depending upon the nature of the projecting portions 34p of the mold 34 (illustrated in FIGS. 1 and 3). The sheet 36 comprises the facing sheet of a laminated article which is to be formed.

After sheet 36 has been formed into the configuration illustrated in FIG. 4 it is allowed to remain on a mold 34 and a resilient, air-permeable layer of cotton, fiber, rubber, or equivalent material such as layer 56 (illustrated in FIG. 2) is placed on each of the molds 34. It will be noted from FIG. 2 that the resilient layer 56 has apertures 58 formed therein which have been predeterminately positioned so as to interfit with projecting portions 36p of each sheet 36 in the manner illustrated in FIG. 4 as well as in FIGS. 2 and 3. After layer 56 has been placed in position plastic backing sheets (such as sheet 60 illustrated in FIG. 2) are placed between frame members 38 and 40 (illustrated in FIG. 1). Prior to insertion in the frame the surface of the sheets 60 facing the underlying mold member are coated with an adhesive which may be thermoplastic or pressure-sensitive. The oven is then moved over the sheets 60 disposed between the frames of the apparatus 10 until the latter sheet is pliable, and the adhesive disposed thereon is softened and tacky (if thermoplastic). The frames 38 and 40 are again lowered as previously described and a seal formed with gasket members 50. The air is again exhausted from within the confines defined in part by the sheets 60 and table portion 24 of the illustrated apparatus so that the sheets 60 will be forced by atmospheric pressure acting against a zone of reduced pressure. The sheets 60 will engage resilient layers 56 as well as upper exposed portions 37 of projecting portions 36p of sheet 36 and border portions 36d of sheets 36 (see FIG. 3).

It is apparent that if frame member 38 were clamped to the gaskets 50 of the apparatus 10, a seal would be formed between backing sheets 60 and facing sheets 36, preventing the exhaustion of atmosphere entrapped therebetween. To permit withdrawal of such atmosphere a gate member 62 is employed which penetrates the sheet 36 of each member formed (as illustrated in FIG. 3) prior to the lowering of the backing sheet 60. Gate 62 is inserted through the sheet 36 after the sheet has been formed on the mold and disposed so that one terminal portion rests beneath resilient layer 56 and the other within an exhaust conduit 52. Since layer 56 is air-permeable, all of the air between sheets 36 and 60 may be conducted to gate 62 by the layer and exhausted through an exhaust conduit 52. Gate 62 is then seen to function as a means enabling atmosphere to be withdrawn from between the facing and backing sheets of the laminated member such as the member 64 illustrated in FIG. 2. The portion of the facing sheet which is penetrated by the gate 62 is a border or peripheral portion which is not exposed to view in the normal course of article use.

In the course of adhesively securing the backing sheets 60 to the underlying resilient layers 56 and exposed portions of the facing layer 36, the resilient layer is uniformly compressed by atmospheric pressure acting over a zone of reduced pressure until the resulting assembly is both compact and sturdy. It will be noted that there is no manner whereby appreciable shifting of the portions of the resilient layer may take place between the facing and the backing sheets since the projecting portions 36p of the facing sheet 36 serve to constantly retain the resilient layer in a fixed position. A large area of engagement between the backing sheet and the resilient layer also serves to prevent any shifting or movement of the intermediate portions of resilient layer 56.

The completed article may then be removed from the mold member and from the apparatus 10, and gate 62 is removed from engagement with the article 64 for subsequent reuse. Upon inverting, the article will provide the appearance of the assembled portion of the member 64 (illustrated in FIG. 2).

The process just described indicates that the formation of article 64 may be conducted in a substantially automatic manner, requiring a bare minimum of manual operation. The apparatus employed is that well known in the vacuum-forming industry, and the materials of composition used are equally well known. The method of formation is rapid, and in addition to the desired tufted appearance the completed article prevents any shifting of the resilient intermediate layer because of the manner of fabrication above described. If desired, a button configuration (not illustrated) may be formed in the valley portions of the molds 34 so as to form a corresponding button in the formed plastic facing sheet. The degree of compactness of the resilient layer in the article is readily regulated by control of the vacuum which draws the backing sheet thereagainst.

It is intended that this invention also be applicable to the formation of a laminated member having a resilient central layer between opposed facing and backing sheets which do not necessarily effect a tufted appearance. The method described above will enable articles to be formed wherein the central resilient layer is uniformly compressed between the opposed facing and backing sheets. Such uniform compression assures the absence of lumping, and is to be desired in the formation and manufacture of articles such as pillows and the like. FIG. 6 illustrates a section of a laminated article 33 in which a planar facing sheet 35 has a resilient layer 37 disposed thereon which is uniformly compressed thereagainst by backing sheet 39. The formation of article 33 may be accomplished by following the steps above described relative to the formation of cushion-like member 64.

The facing sheet such as sheet 36 in an article such as article 64 (illustrated in FIG. 2) need not necessarily be plastic; it may comprise cloth or any well known material used for covering articles of furniture. If cloth is the desired exterior facing, the previously described process is carried out with the exception that the desired facing cloth is first placed on mold members 34 prior to the application of a thermoplastic sheet corresponding to the facing sheet 36. Such adhesive-coated thermoplastic sheet is then forced by atmospheric pressure acting against the cloth facing disposed on the apertured mold in communication with a vacuum chamber in the manner previously described. Upon application of vacuum the plastic sheet is forced into conformance with the exact contour of the mold and underlying upholstery material, and the heat-sensitive adhesive thereon seals the plastic to each fiber of the material, effecting lamination of the upholstery cloth to a desired plastic backing. The foregoing steps, comprising the insertion of the resilient intermediate layer and backing sheet, may then be carried out in the manner described.

An article such as 51 of FIG. 5 will then have an appearance similar to the pad of FIG. 2, with the exception that an exterior facing layer 36c will be of a desired material; the resilient layer 56 and backing layer 60 may be the same as in cushion-like member 64 of FIG. 2. Plastic layer 36b will reinforce the cloth 36c and should preferably be of such thickness as to enable the cloth to retain the mold shape after cooling.

There are certain applications wherein the desired article merely comprises the cloth facing with a rigid plastic backing. This laminated facing layer is of sufficient rigidity to retain a definite shape if no forces or pressures are exerted thereon. Such a rigid lamination may be utilized for instance in the lining of a casket member where appearance alone is desired. Accordingly it is apparent that such a rigid lamination may be readily formed following the steps above outlined.

A novel article of manufacture has been disclosed as well as the process for making same. The novel articles provided may be manufactured much cheaper than similar articles formed in accordance with older and well known methods; in addition, the novel articles provided possess many functional advantages not found in the previously used articles.

It is apparent that certain changes may be made in the articles and processes described above which will not depart from the ambit of the inventive concepts presented. It is intended therefore that this invention be limited only by the scope of the appended claims.

I claim:

1. A process for producing a laminated article comprising forming a face sheet into desired configuration having a plurality of projections formed on one surface thereof and non-projecting portions interposed therebetween, applying an intermediate layer to the surface of said face sheet having projections formed therein, said intermediate layer having apertures formed therein whereby said face sheet projections may pass therethrough and said layer may rest on said face sheet non-projecting portions, and sealingly applying a backing sheet to said intermediate layer exposed surface by withdrawing atmosphere from between said face sheet and backing sheet so as to effect a pressure between said sheets which is less than the pressure existing on the exterior of said sheets, whereby said intermediate layer is uniformly compressed against said face sheet, and said backing sheet is sealed to engaged portions of said intermediate layer and said face sheet.

2. A process for producing a laminated article comprising the steps of vacuum-forming a pliable thermoplastic face sheet into a desired tufted configuration having upstanding portions, placing an apertured layer of resilient material on the tufted thermoplastic sheet so that said upstanding tuft portions of said thermoplastic face sheet interfit with said resilient material apertures, and sealingly applying a plastic backing sheet to said resilient material layer and portions of said face sheet uncovered thereby by exhausting atmosphere therebetween so as to effect a pressure between said face sheet and said backing sheet which is less than the pressure existing on the exterior of said sheets, whereby said resilient layer is uniformly compressed between said face sheet and said backing sheet.

3. A process for forming a laminated resilient article comprising the steps of forming a facing layer into a desired configuration having projections therein, applying an apertured resilient layer in interfitting relationship with said facing layer whereby said facing layer projections are received in the apertures of said resilient layer, and sealing a backing sheet to said resilient layer and distal portions of said facing layer traversing said resilient layer apertures by exhausting the atmosphere from between said backing sheet and facing layer so as to effect a pressure therebetween which is less than the pressure existing on the exterior thereof.

References Cited in the file of this patent

UNITED STATES PATENTS

| | | |
|---|---|---|
| 1,908,682 | Bronson | May 16, 1933 |
| 2,670,501 | Michiels | Mar. 2, 1954 |
| 2,745,212 | Guzzino | May 15, 1956 |
| 2,781,820 | Rogers | Feb. 19, 1957 |
| 2,861,405 | Hanford | Nov. 25, 1958 |
| 2,888,787 | Cloud | June 2, 1959 |
| 2,978,376 | Hulse | Apr. 4, 1961 |
| 2,991,600 | Lancaster | July 11, 1961 |

FOREIGN PATENTS

| | | |
|---|---|---|
| 752,719 | Great Britain | July 11, 1956 |